Nov. 13, 1962     M. L. SUGARMAN, JR., ET AL     3,063,861
METHOD OF MANUFACTURING INFRARED TRANSMITTING FILTERS
Filed Feb. 17, 1950
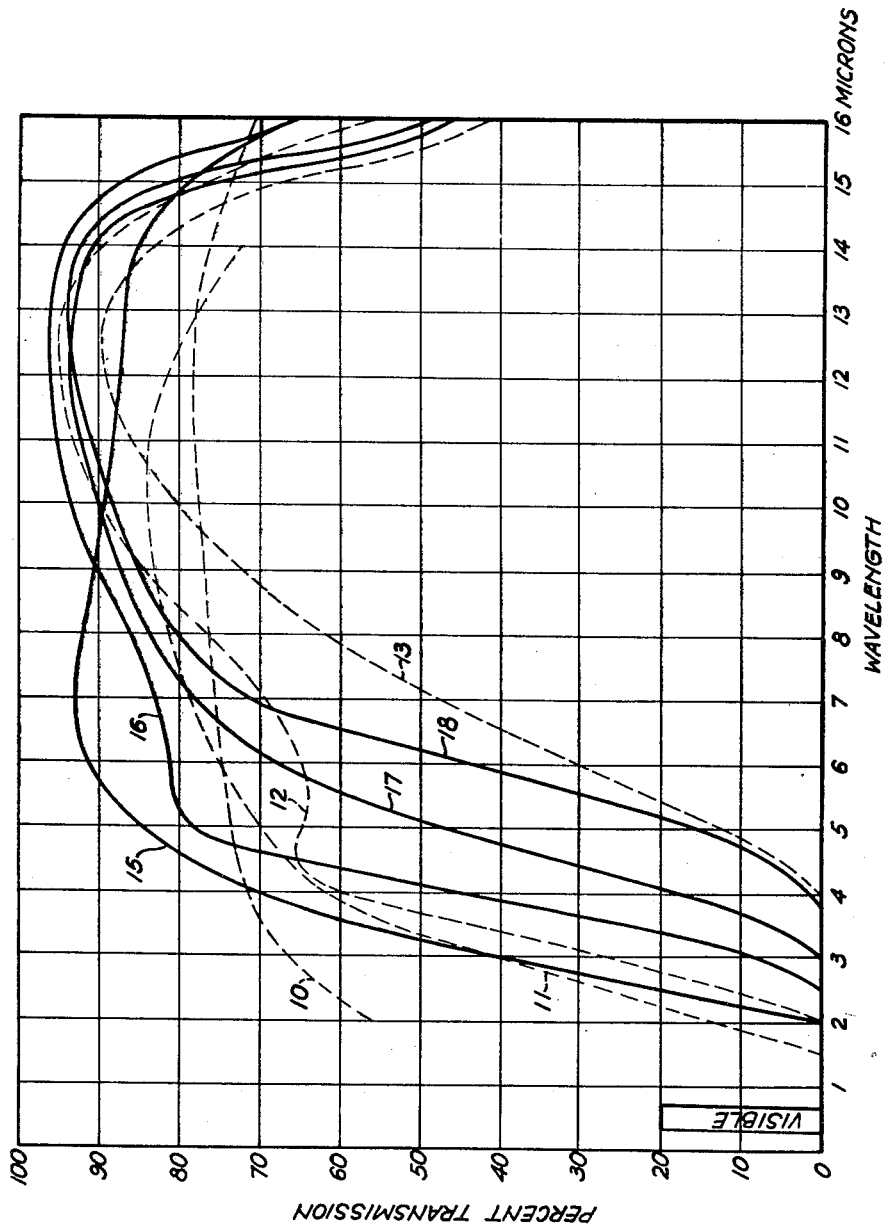
MEYER L. SUGARMAN, JR.
FRANK C. BENNETT, JR.
GUSTAF W. HAMMAR
INVENTORS
BY Daniel J. Mayne
F. M. Emerson Holmes
ATTORNEYS

United States Patent Office 3,063,861
Patented Nov. 13, 1962

3,063,861
METHODS OF MANUFACTURING INFRARED TRANSMITTING FILTERS
Meyer L. Sugarman, Jr., Frank C. Bennett, Jr., and Gustaf W. Hammar, Rochester, N.Y., assignors to Eastman Kodak Company, Rochester, N.Y., a corporation of New Jersey
Filed Feb. 17, 1950, Ser. No. 144,811
2 Claims. (Cl. 117—33.3)

This invention relates to methods of manufacturing infrared transmitting filters which absorb all visible radiation. It relates particularly to an improvement of the method described in a patent application by two of us (Hammar and Bennett) Serial No. 61,624, filed November 23, 1948, now abandoned, and in a continuation-in-part thereof filed concurrently herewith, Serial No. 144,812.

The object of the present invention is to obtain higher transmission in the infrared than formerly obtainable and particularly to provide filters whose transmission curves rise rapidly from the cut-off point to over 80% transmission. Specifically filters according to the present invention reach over 80% transmission in less than 5 microns above the cut-off point which is the point below which all wave lengths are highly absorbed. In fact, some filters according to the present invention have such a steep transmission curve that they reach the 80% value in less than 3 microns whereas the best prior art filter, namely that shown in curve 11 of the above mentioned copending applications required about 5½ microns and all other prior art filters required over 6 microns before they reached 80% efficiency.

Incidentally, the present invention also in general increases the transmission at the point of maximum transmission as compared to filters according to the above mentioned copending application. At least the present method does not lose any of the advantage gained in this connection by the invention of the copending cases.

Another advantage gained by the present invention is that the resulting filters have even greater opacity (well below 1% transmission) throughout the visible and infrared up to the cut-off point. Still another advantage is that the procedure permits increased flexibility of control in that two separate periods of immersion are involved.

According to the copending application filters were prepared by immersing a clean polished sheet of crystalline silver chloride in a dilute aqueous solution of hydrogen sulfide with or without a subsequent baking of the sheet. The highly important advantages of the present invention are gained simply by a double dipping procedure with a baking of the sheet between the immersions. An additional bake may be added after the second dip. According to the present invention, the clean polished sheet of crystalline silver chloride is immersed in an aqueous solution with a concentration between .02 and .1 normal of hydrogen sulfide for a period of time between 1 and 30 seconds. The sheet is then baked for a period of time between 10 and 300 minutes at a temperature of above 175° C. and below the melting point of the silver chloride which is about 455° C. Very little is gained after the first hour of baking. The sheet is then re-immersed in a similar hydrogen sulfide solution for a similar period of time and then dried or again baked.

The accompanying drawing shows the transmission curves for four filters made according to the invention in comparison with three made according to the prior art.

In the drawing curve 10 represents the transmission for an untreated sheet of polished silver chloride. Curve 11 shows the transmission for the most highly transmitting of filters of this type made prior to those described in the above mentioned copending applications. Curves 12 and 13 are representative curves selected from the copending applications. Curves 15, 16, 17 and 18 are the transmission curves for filters made respectively according to Examples A, B, C, and D of the present invention, described in detail below:

*Example A.*—A sheet of silver chloride polished to a transmission of about 79% between 2 and 14μ (wavelength in microns) is degreased in an organic solvent and immersed in nitric acid until clean. The piece is then rinsed in a solution of a wetting agent (such as Aerosol OT), and immediately thereafter immersed with agitation in a 0.03 normal $H_2S$ solution for 4 seconds, again rinsed in $H_2O$ and dried. The silver sulfide coated sheet is baked for 1 hour at 200° C., cooled to room temperature, wetted in water containing a wetting agent, and then re-dipped in 0.03 normal $H_2S$ solution for a period of 5 seconds, rinsed quickly and dried. The coating produced by such a procedure has the following characteristics:

(1) High opacity in the visible to 2μ region.
(2) A very rapid increase in transmission with wavelength to about 85% by 5μ.
(3) Transmission above 80% between 4.5μ and 14.5μ, and above 90% between 6μ and 11μ.

There is nothing critical about the particular wetting agent used. There do not appear to be any known ones which damage the silver chloride sheet, but if there were, they should of course be avoided. Those commonly sold as kitchen detergents (fatty alcohol sulfates) are quite satisfactory.

*Example B.*—A silver chloride sheet is polished and cleaned as above, rinsed in wetting agent solution dipped in 0.078 normal $H_2S$ solution for 2 seconds, rinsed, dried, baked 1 hour at 200° C., rewetted, redipped in 0.078 normal $H_2S$ for 5 seconds, rinsed, and again dried. This gives a filter with the following characteristics:

(1) Opacity up to 2.6μ.
(2) Extremely rapid rise in transmission to above 75% by 5μ.
(3) Transmission in excess of 80% from 5.4 to beyond 15μ and exceeding 90% from 9μ to 14.5μ.

*Example C.*—A similar silver chloride blank is treated in the same steps, using a first dip of 4 seconds in 0.05 normal $H_2S$ solution and a second dip of 5 seconds in 0.05 normal $H_2S$ after the bake. Results are as follows:

(1) Opacity up to 3μ.
(2) Rapid rise in transmission to almost 70% at 6μ.
(3) Transmission above 80% from 7.4μ to about 15μ, above 90% from 9.4μ to 14μ.

*Example D.*—A silver chloride sheet is given similar treatment, with a first dip of 8 seconds in 0.07 normal $H_2S$ solution, baking at 200° for 1 hour, and a re-dip of 4 seconds in 0.07 normal $H_2S$. After an additional bake for 1 hour at 200° C., the double-coated filter shows the following final characteristics:

(1) High opacity up to the 4μ region.
(2) Rapid rise to above 70% transmission at 7μ.
(3) Transmission in excess of 80% from 8μ to 15μ, in excess of 90% from 11μ to 14μ.

As illustrated in curves 15–18, the filters according to the four processes have the characteristics set forth precisely in the following table:

| Example | Opaque to— | Over 80% at— | Difference |
|---|---|---|---|
| A | 1.95μ | 4.6μ | 2.65μ |
| B | 2.6μ | 5.2μ | 2.6μ |
| C | 3.06μ | 7.3μ | 4.24μ |
| D | 3.85μ | 7.75μ | 3.90μ |

A third dip in $H_2S$ solution after the second bake appears in some cases to give added improvement but beyond this, additional dips appear to be practically unnecessary.

The present invention is not limited to these four preferred examples, but is of the scope of the appended claims.

We claim:
1. The method of producing black filters which absorb all visible and infrared wavelengths shorter than 2 microns substantially completely and whose transmission curve rises to over 80% at a wavelength less than 5 microns above the cut-off point below which all wavelengths are highly absorbed which comprises immersing a clean polished sheet of crystalline silver chloride in an aqueous solution with a concentration between 0.02 and 0.1 normal, of hydrogen sulfide for a period of time between 1 and 30 seconds, baking the sheet for a period of time between 10 and 300 minutes at a temperature above 175° C. and below the melting point of the silver chloride, then re-immersing the sheet in a similar solution for a similar period of time and drying the sheet.

2. The method according to claim 1 including the additional step of re-baking the sheet after the second immersion for a similar period of time and at a similar temperature.

References Cited in the file of this patent

UNITED STATES PATENTS

| | | |
|---|---|---|
| 2,420,956 | Kremers et al. | May 20, 1947 |
| 2,445,962 | Mell | July 27, 1948 |